No. 633,935. Patented Sept. 26, 1899.
H. D. WILSON & T. J. SMITH.
COTTON CHOPPER.
(Application filed Aug. 19, 1899.)

(No Model.)

Witnesses
Jas H Blackwood
H P Doolittle

Inventors
Henry D Wilson
Taylor J Smith
by P H Doolittle & Son
Attorneys

THE NORRIS PETERS CO., PHOTO-LITHO., WASHINGTON, D. C.

UNITED STATES PATENT OFFICE.

HENRY D. WILSON AND TAYLOR J. SMITH, OF BAINBRIDGE, GEORGIA.

COTTON-CHOPPER.

SPECIFICATION forming part of Letters Patent No. 633,935, dated September 26, 1899.

Application filed August 19, 1899. Serial No. 727,840. (No model.)

*To all whom it may concern:*

Be it known that we, HENRY D. WILSON and TAYLOR J. SMITH, citizens of the United States, residing at Bainbridge, in the county of Decatur and State of Georgia, have invented certain new and useful Improvements in Cotton-Choppers; and we do hereby declare the following to be a full, clear, and exact description of the invention, such as will enable others skilled in the art to which it appertains to make and use the same.

Our invention relates to cotton-choppers, and has for its objects to provide a chopper that will readily pass through the soil and effectually cut the cotton without collecting weeds or trash, that can be easily adjusted to thin or chop the stalks at different intervals and to penetrate to different depths, and that can be easily raised from engagement with the soil by means of a frame of compact and convenient structure when it is not desired to use the chopper.

Our invention is illustrated in the accompanying drawings, in which—

Figure 1:
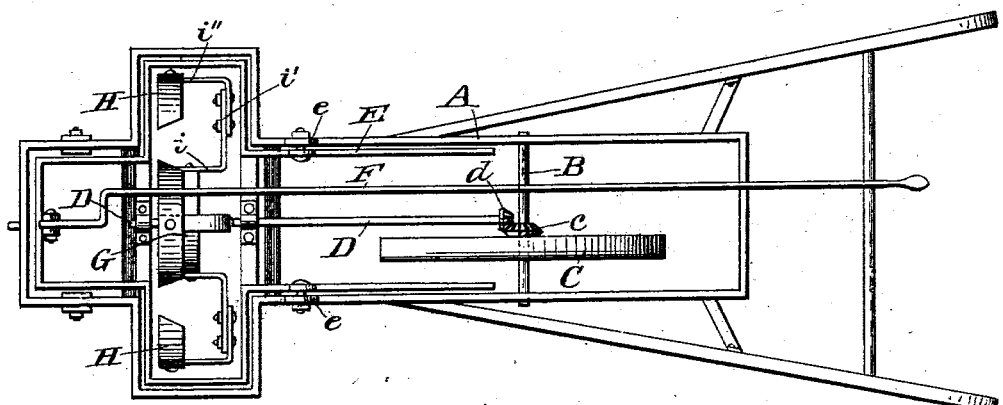
Figure 3:
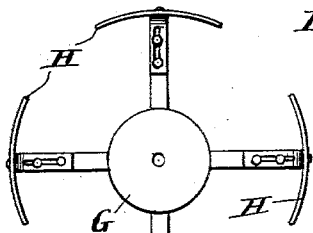
Figure 2:
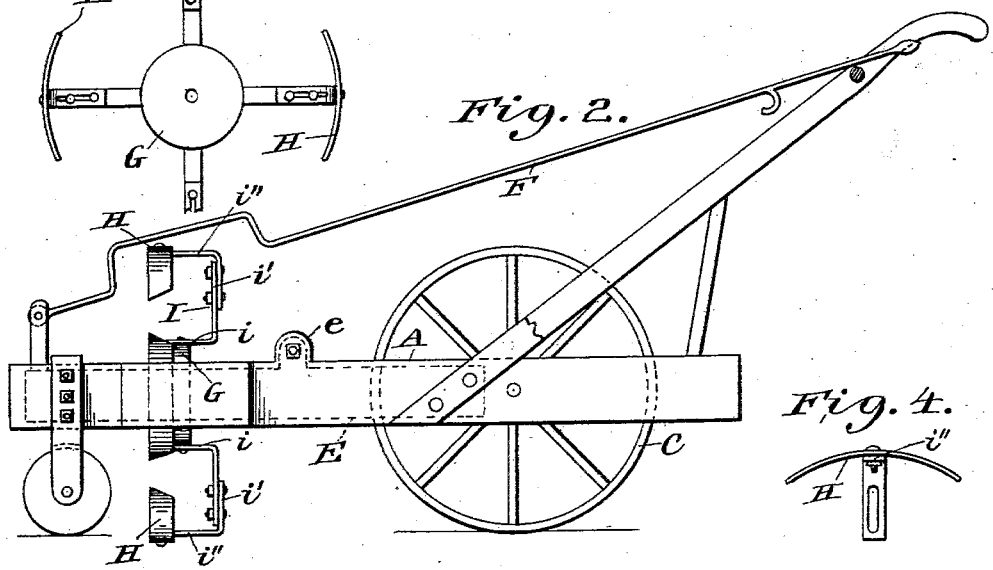
Figure 4:
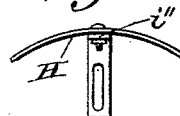

Figure 1 is a plan view of the chopper; Fig. 2, a side view in elevation, and Fig. 3 a front view in elevation, of the chopping-disk; and Fig. 4, a detail of blade and its fastening-bolt.

Referring to the drawings, A is the main frame of the chopper. In this frame is mounted an axle B, carrying driving-wheel C. On the axle of this wheel is carried a bevel-gear $c$, meshing with a similar gear $d$, which is carried by a rotatable shaft D. At its opposite end the shaft is journaled in cross-pieces of an auxiliary frame E. This frame corresponds exactly in shape and construction to the main frame A and fits within the latter frame so as to occupy but little space. The auxiliary frame is pivoted to the ears $e$ of the main frame and is raised and lowered by means of a lever F, pivoted to an arm at the front of the frame and provided with a hook near its free end to engage the cross-bar of the chopper-handle.

Fixed to the shaft D within the frame E and between the journals of the shaft is a blade-carrying disk G. At suitable intervals around the circumference of this disk are secured any desired number of chopping-blades H. Each blade is secured to the disk by means of a shank I, which consists of the arm $i$, parallel to the disk-axle and fastened to the disk, the radial arm $i'$, bent or curved from part $i$ at substantially right angles thereto, and the arm $i''$, bent at substantially a right angle to part $i'$ and parallel to arm $i$. To the end of arm $i''$ is secured the blade H, which extends longitudinally parallel with the circumference of the hub of the disk. By bending or curving the shank into the wicket-like or U-shaped form shown and described a clearance-space is formed between the blade and disk-hub through which the weeds and trash will pass, and the blade will have a smooth uninterrupted surface on each side, thereby permitting it to easily cut through the soil. The arm $i'$ of the shank is divided, and the two parts are adapted to be slidably adjustable upon each other, one part being provided with a slot and the other part with a set-screw for this purpose. The object of the adjustability of this is to increase or decrease the size of the circumference of the circle formed by the blades H and to thus increase or lessen the distance between the blades and to also vary the depth of penetration of the blades. The blades are also adjustably secured to the arms $i''$ by means of a slot and set-screw for the purpose of setting the blades at different cutting-angles.

In operation the chopper in being drawn along will cause the wheel C to rotate the bevel-gears and turn shaft D, which will cause the rotation of the blade-carrying disk G. This disk will carry the blades H around and force them through the cotton ridge, the smooth sides of the blades lying flat on the ground and passing freely through the soil, and the sharp longitudinal outer edges cutting the stalks, the clearance-space between the blades and hub permitting the free escape of the weeds and trash therethrough. The space between the blades may be adjusted by sliding up and down the parts of arm $i'$ in each other. To remove the blades from engagement with the soil the pivoted auxiliary frame E is lifted by means of the lever F and held in place by the lever-hook. This action will also throw the disk-shaft and driving-wheel out of gear.

It is obvious that the shank of the blade may be bent or curved in a somewhat different way from that shown and described, provided the U shape is substantially retained, whereby the clearance-space between the blade and disk is formed, and it is obvious also that numerous other changes in construction may be made without departing from the principle of our invention.

Having thus described our invention, what we claim is—

1. In a cotton-chopper, a rotatably-driven disk, chopping-blades longitudinally parallel to the circumference of the disk, shanks for said blades secured to said disk, said shanks bent substantially U-shaped, substantially as and for the purpose described.

2. In a cotton-chopper, in combination with a disk, chopping-blades longitudinally parallel to the circumference of said disk, said blades provided with cutting edges parallel to the disk circumference, shanks securing said blades to said disk, said shanks bent outward and then inward to form a clearance-space between said blades and disk, substantially as described.

3. In a cotton-chopper, a disk, chopping-blades, U-shaped shanks for said blades, the arms of said shanks divided and a slot and set-screw to radially adjust the parts of said arms, whereby the space between the ends of said blades may be adjusted, substantially as described.

4. In a cotton-chopper, in combination with a main frame, an adjustable pivoted auxiliary frame, a driving-wheel, a disk carried by said auxiliary frame, means to rotate said disk by said wheel, chopping-blades longitudinally parallel to the circumference of said disk, U-shaped shanks carrying said blades, and means to radially adjust said shanks, substantially as described.

In testimony whereof we affix our signatures in presence of two witnesses.

HENRY D. WILSON.
TAYLOR J. SMITH.

Witnesses:
J. S. BRADWELL,
H. P. SIMS.